(12) United States Patent
Cheng (10) Patent No.: US 7,184,181 B2
(45) Date of Patent: Feb. 27, 2007

(54) SCANNING MODULE CAPABLE OF FINELY TUNING THE OPTICAL LENGTH

(75) Inventor: Jyi-Fang Cheng, Taipei (TW)

(73) Assignee: Teco Image Systems Co., Ltd., Taipei (TW)

( * ) Notice: Subject to any disclaimer, the term of this patent is extended or adjusted under 35 U.S.C. 154(b) by 887 days.

(21) Appl. No.: 10/255,943

(22) Filed: Sep. 27, 2002

(65) Prior Publication Data

US 2004/0061908 A1    Apr. 1, 2004

(51) Int. Cl.
  *H04N 1/04* (2006.01)
(52) U.S. Cl. .................. 358/474; 358/1.5; 358/505; 358/509; 250/550.38; 250/548; 348/374; 359/700
(58) Field of Classification Search .............. 358/474, 358/1.5, 505, 509, 475, 513; 250/548, 550.38; 348/374; 359/700
  See application file for complete search history.

(56) References Cited

U.S. PATENT DOCUMENTS

| | | | | |
|---|---|---|---|---|
| 3,649,120 A | * | 3/1972 | Pfeifer et al. ................. | 355/68 |
| 4,497,573 A | * | 2/1985 | Tokuhara et al. ............. | 355/58 |
| 5,237,362 A | * | 8/1993 | Ishino et al. .................. | 396/79 |
| 6,122,038 A | * | 9/2000 | Cilke et al. .................... | 355/84 |
| 6,424,434 B1 | * | 7/2002 | Uchida ........................ | 358/474 |

\* cited by examiner

*Primary Examiner*—Douglas Q. Tran
*Assistant Examiner*—Negussie Worku
(74) *Attorney, Agent, or Firm*—Browdy and Neimark, PLLC (57) ABSTRACT

A scanning module capable of finely tuning the optical length comprises a lamp tube, a base, a photosensitive substrate, and an adjustment unit. The lamp tube provides a required light source for a document to be scanned. The base has a reflective mirror set and a camera lens. The reflective mirror set is used to receive light from the document, and transmits the light to the camera lens for focusing. The photosensitive substrate is used to convert light outputted by the camera lens into electronic signals. The adjustment unit is used to adjust the optical length between the base and the photosensitive substrate. The total optical length can thus be adjusted to correct the inaccuracy of magnification. Or the distance between the camera lens and the photosensitive substrate can be adjusted to align the focal length within the allowable inaccuracy of magnification to achieve an output image of better quality.

21 Claims, 7 Drawing Sheets

SCANNING MODULE CAPABLE OF FINELY TUNING THE OPTICAL LENGTH

FIELD OF THE INVENTION

The present invention relates to a scanning module capable of finely tuning the optical length and, more particularly, to a scanning module, which adjusts the total optical length or the distance between a camera lens and a photosensitive substrate by adjusting the front and rear position of a photosensitive component to align the focal length.

BACKGROUND OF THE INVENTION

Generally, when a scanning module (e.g., a scanner of computer peripheral or a multi-functional printer used in the office or home) is used for scanning, the initial magnification is controlled by the design of a camera lens in the scanning module. In other words, when a document is placed on the scanning module for scanning, a light source projects light onto the document, and a reflective mirror set in the scanning module receives light from the document. The light is then reflected to the camera lens and focused onto a photosensitive component, which converts analog optical signals into digital signals representing an image to finish scanning and conversion of the whole document image.

However, there is inevitably inaccuracy in the magnification of the above camera lens. Moreover, the total optical length between the document and the photosensitive component may change due to inaccuracy in the arranged position of the reflective mirror set in the scanning module. Therefore, the scanning quality of the document cannot be effectively controlled, and the quality of the final output image is affected.

Accordingly, the above conventional scanning module has inconvenience and drawbacks in practical use. The present invention aims to resolve the problems in the prior art.

SUMMARY OF THE INVENTION

The primary object of the present invention is to provide a scanning module capable of finely tuning the optical length, which adjusts the total optical length to offset the inaccuracy of magnification so as to let the inaccuracy of magnification of the scanning module meet the requirement, or adjusts the distance between a camera lens and a photosensitive substrate to offset inaccuracy so as to let the optical lengths at the left and right ends of a photosensitive component coincide with each other, thereby enhancing the yield and quality of production.

Another object of the present invention is to provide a scanning module capable of finely tuning the optical length, which can enhance the support of a photosensitive substrate to effectively avoid deformation of the photosensitive substrate due to lockup or the trouble of external indiscriminate light entering into a photosensitive component due to a formed gap.

To achieve the above objects, the present invention provides a scanning module capable finely tuning the optical length, which comprises a lamp tube, a base, a photosensitive substrate, and an adjustment unit. The lamp tube provides a required light source for a document to be scanned. The base has a reflective mirror set and a camera lens. The reflective mirror set is used to receive light from the document, and transmits the light to the camera lens for focusing. The photosensitive substrate is used to perform image processing to the light focused by the camera lens. The adjustment unit is used to adjust the optical length between the base and the photosensitive substrate.

The various objects and advantages of the present invention will be more readily understood from the following detailed description when read in conjunction with the appended drawing, in which:

DETAILED DESCRIPTION OF THE PREFERRED EMBODIMENTS

Figure 1:
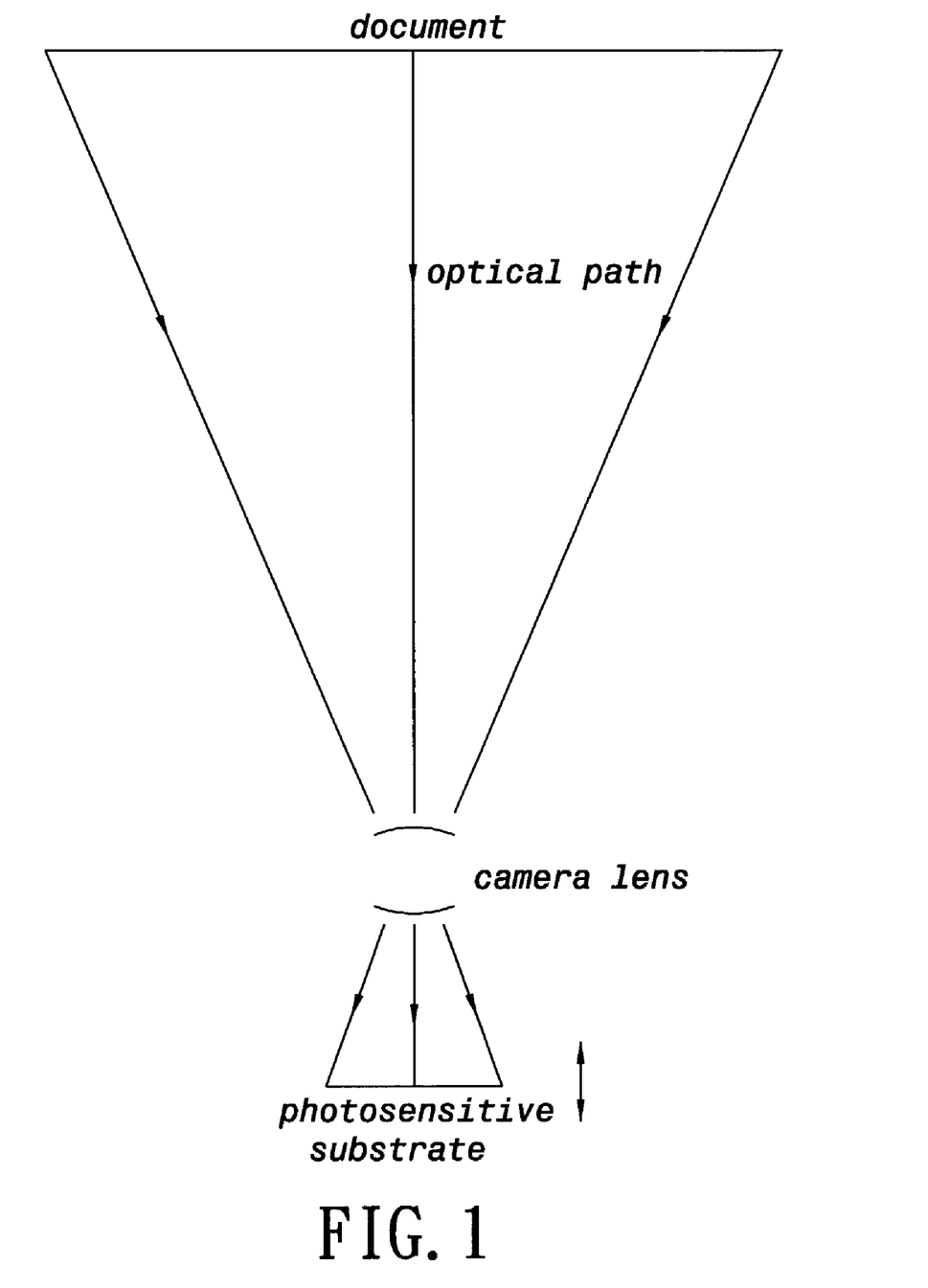
FIG. 1 is a diagram of the scanning and imaging optical path of the present invention.
Figure 2:
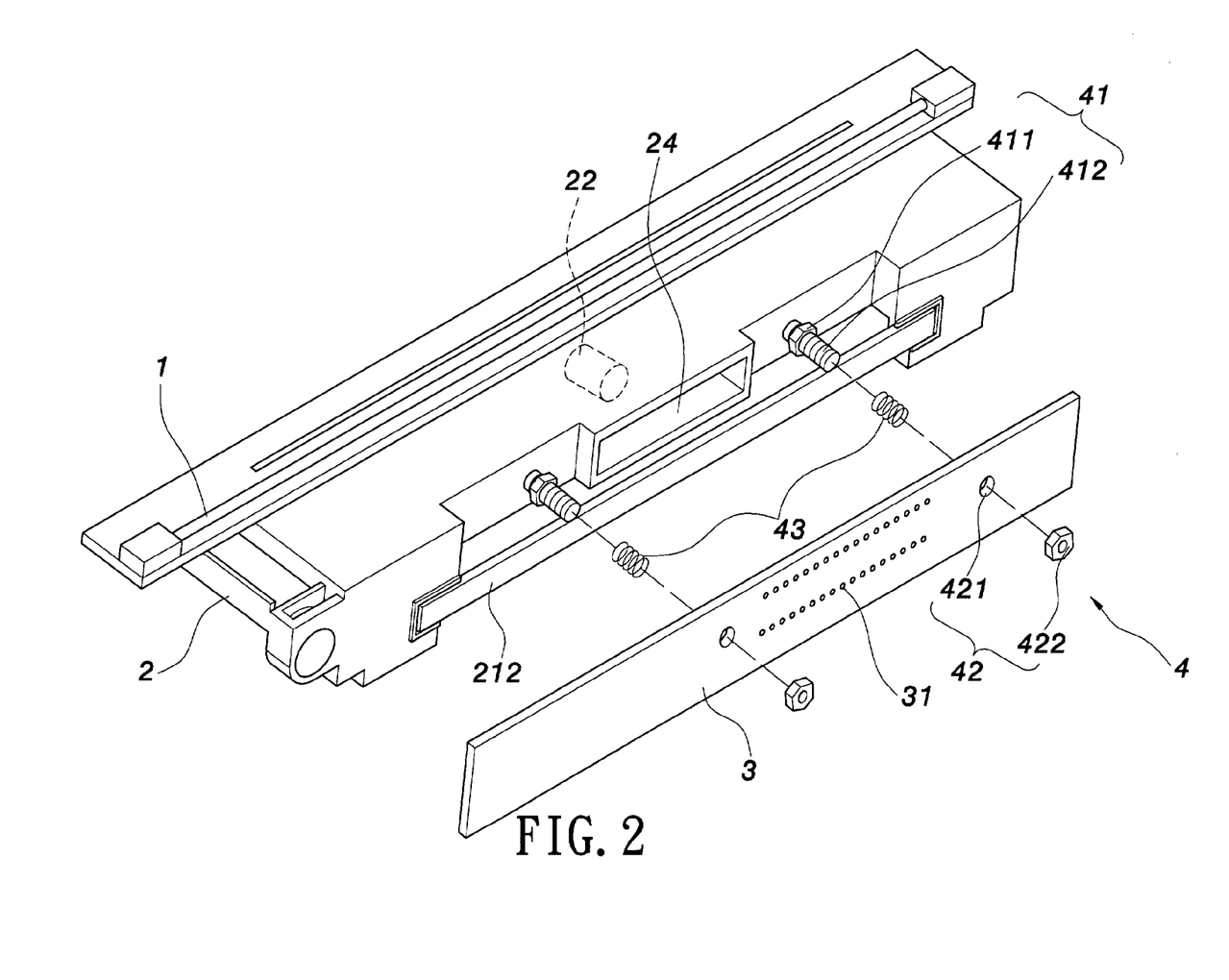
FIG. 2 is a perspective view of a first embodiment of the present invention.
Figure 3:
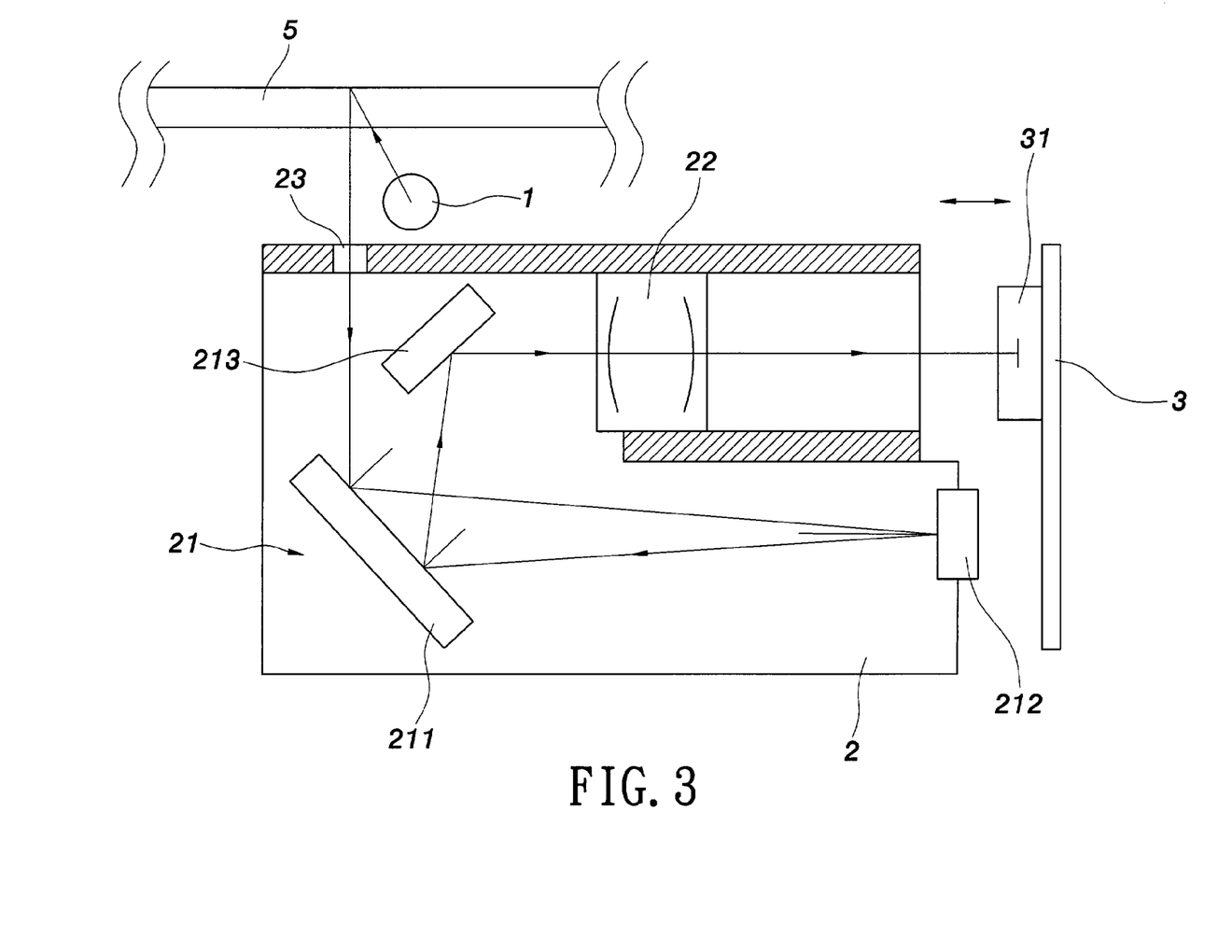
FIG. 3 is a cross-sectional view of the internal optical path of the first embodiment of the present invention.

As shown in FIGS. 1 to 3, a scanning module capable of finely tuning the optical length of the present invention comprises a lamp tube 1, a base 2, a photosensitive substrate 3, and an adjustment unit 4.

FIG. 1 is a diagram of the optical path of scanning and imaging of the present invention, wherein the photosensitive substrate 3 are adjusted (i.e., the total optical length is adjusted) to parallel and keep a certain distance with a document being scanned, thereby offsetting inaccuracy in manufacturing of a camera lens, or inaccuracy of the total optical length due to other factors, or inaccuracy due to the optical paths of the left and right ends of the photosensitive substrate 3 being inconsistent. An output image of better quality can thus be achieved.

The base 2 is disposed below the lamp tube 1. An optical slit 23 is disposed on top of the base 2. A reflective mirror set 21 and a camera lens 22 are disposed in the base 2. The reflective mirror set 21 is composed of a first reflective mirror 211, a second reflective mirror 212, and a third reflective mirror 213. The camera lens 22 is disposed along the optical path of the light outputted from the reflective mirror set 21, and is used to focus the outputted light. An opening 24 for the camera lens 22 to output light is disposed at the outside of the base 2.

The photosensitive substrate 3 is disposed outside the base 2, and is used to perform image processing to the light focused by the camera lens 22. A charge-coupled device 31 (CCD) is disposed on the photosensitive substrate 3. The CCD 31 is used to convert analog optical signals into digital signals representing an image.

The adjustment unit 4 is composed of a first connection portion 41 and a second connection portion 42, and is used to adjust the optical length between the base 2 and the photosensitive substrate 3. The first connection portion 41 is disposed beside the output optical path of the camera lens 22 disposed in the base 2, and is composed of adjustment screw nuts 411 and screw posts 412. The screw posts 412 are disposed at two sides of the opening 24. The adjustment screw nuts 411 are screwed onto the screw posts 412 to determine the optical length between the base 2 and the photosensitive substrate 3.

The second connection portion 42 is disposed on the photosensitive substrate 3, and is composed of through holes 421 and fixing screw nuts 422. The through holes 421 are disposed at two sides of the CCD 31, and are passed through by the screw posts 412. When the screw posts 412 pass through the through holes 421, the photosensitive substrate 3 can move on the screw posts 412.

When the first connection portion 41 and the second connection portion 42 are connected together, the screw posts 412 respectively pass through elastic bodies 43 and the through holes 421. The fixing screw nuts 422 are then screwed onto the screw post 412 protruding out of the through holes 421 until the elastic bodies 43 slipped on the screw posts 412 are compressed and abut against the adjustment screw nuts 411 to tightly secure the photosensitive substrate 3 between the adjustment screw nuts 411 and the fixing screw nuts 422. The base 2 and the photosensitive substrate 3 can thus be connected and fixed together. The elastic bodies 43 are springs, and are used to generate an elastic force so as to facilitate temporary positioning during the adjustment process by lightly pressing the photosensitive substrate 3 before the adjustment (i.e., the relative positions of the adjustment screw nuts 411, the photosensitive substrate 3, and the fixing screw buts 422) is finished.

When the above structure is used for scanning, a document to be scanned (not shown) is first placed on a glass 5. Light from the lamp tube 1 projects onto the document. The reflective mirror set 21 in the base 2 then receives light from the document. The first reflective mirror 211 reflects the light from the optical slit 23 to the second reflective mirror 212, which then reflects the light to the third reflective mirror 213. Next, the third reflective mirror 213 transmits the light to the camera lens 22 for focusing. The position of the photosensitive substrate 3 is adjusted to make the light outputted from the optical slit be exactly projected onto the CCD 31. The adjustment of the fixing screw nuts 42 can adjust the CCD 31 to the best focus position. After the adjustment is finished, the adjustment screw nuts 411 are tightly screwed toward the direction of the photosensitive substrate 3. The photosensitive substrate 3 performs image processing to the light focused by the camera lens 22 to obtain digital signals representing an image. The magnification of the camera lens 22 may vary with the total optical length due to inaccuracy in manufacturing of the camera lens 22 or inaccuracy in the placement position of the reflective mirror set 21. Therefore, the total optical length between the camera lens 22 and the photosensitive substrate 3 can be adjusted by adjusting the position of the camera lens 22 and the adjustment unit 4 to offset the above inaccuracies.

Figure 4:
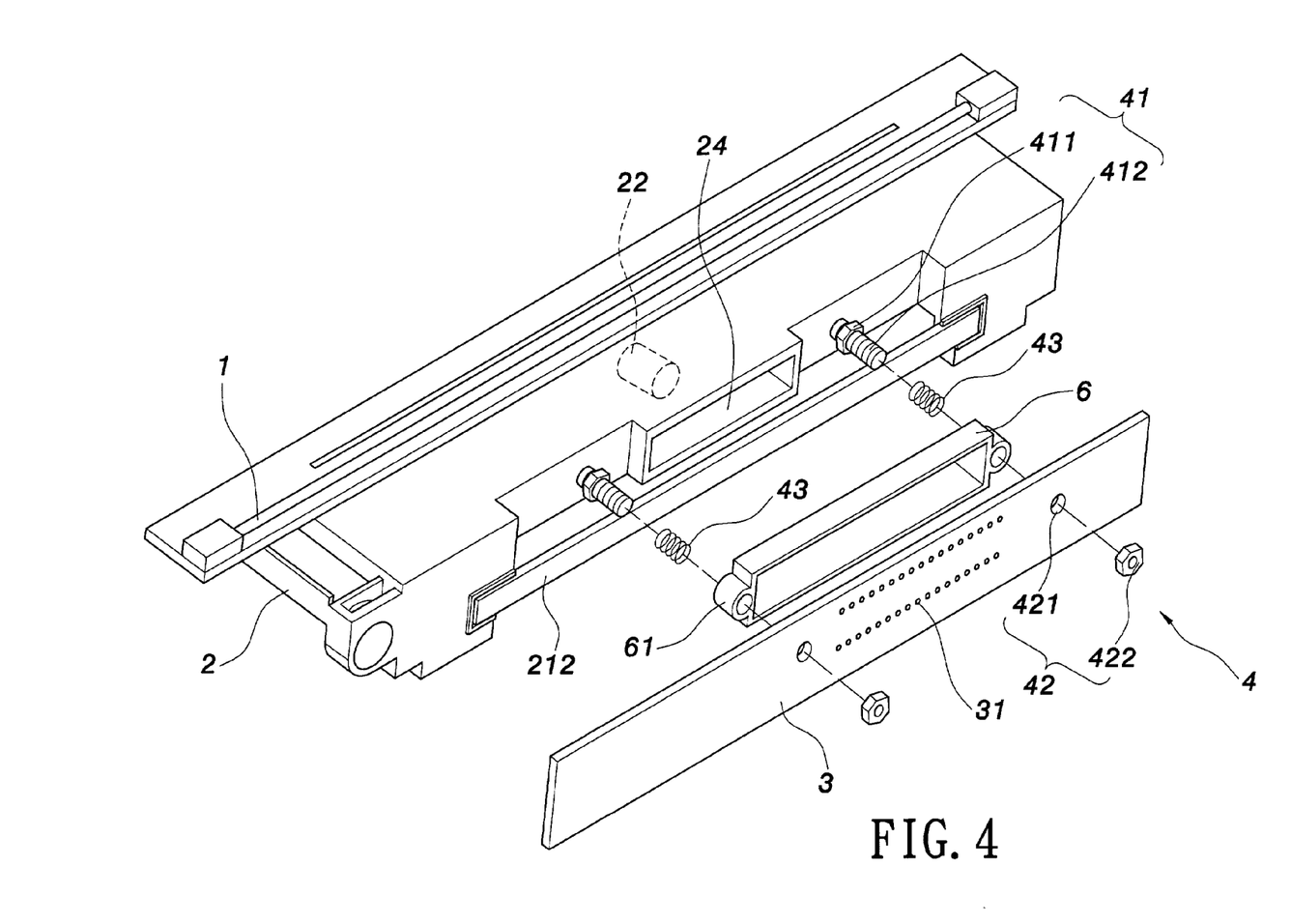
FIG. 4 is a perspective view of a second embodiment of the present invention.
Figure 5:
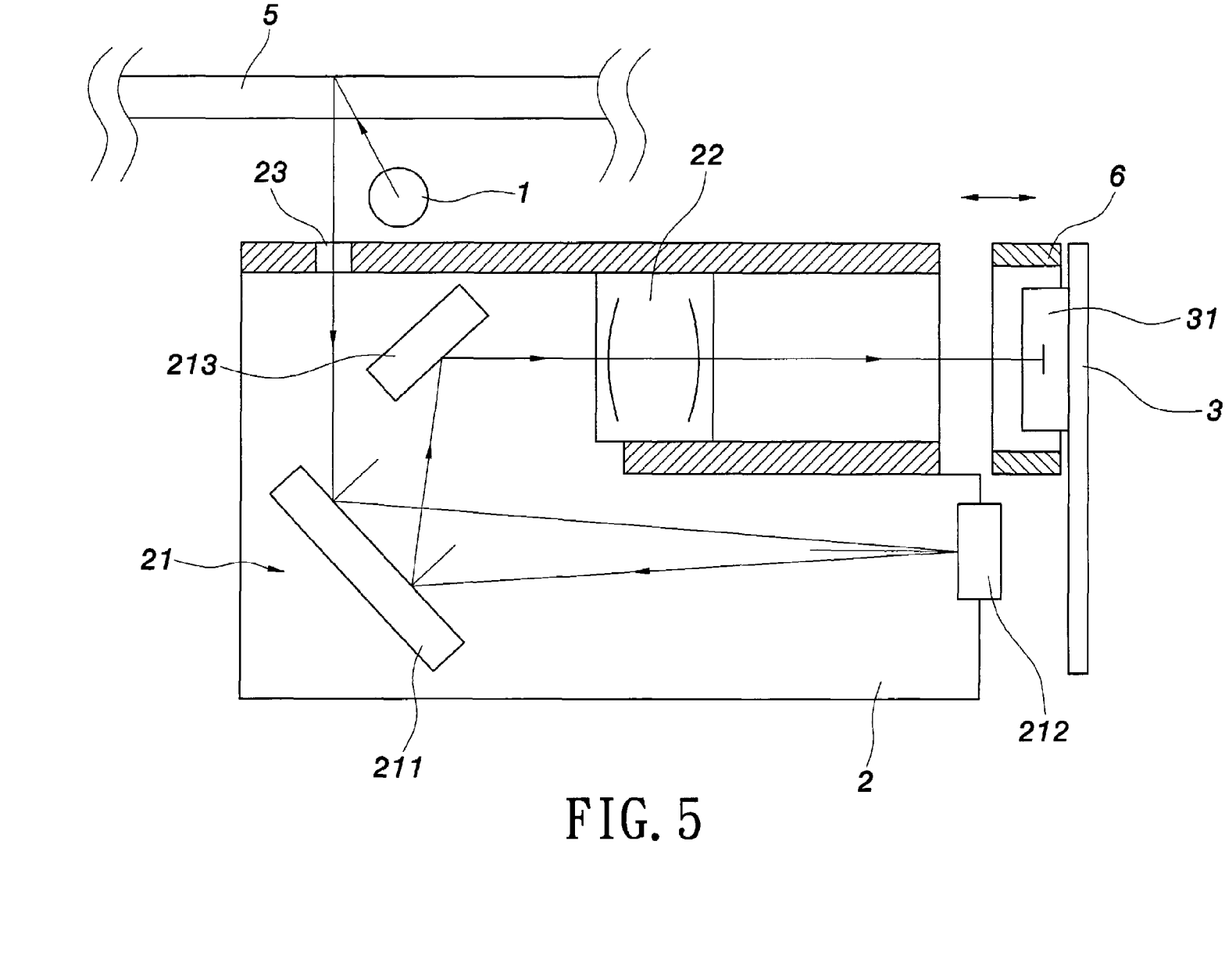
FIG. 5 is a cross-sectional view of the internal optical path of the second embodiment of the present invention.

As shown in FIGS. 4 and 5, in order to avoid deformation of the photosensitive substrate 3 due to lockup of the photosensitive substrate 3 and the base 2 and the trouble of external indiscriminate light entering into the CCD 31 on the photosensitive substrate 3 due to a gap generated when adjusting the optical length, an auxiliary seat 6 is disposed at one side of the photosensitive substrate 3. The auxiliary seat 6 is disposed between the base 2 and the photosensitive substrate 3. The auxiliary seat 6 is a long hollow shell body to be passed through by light. Projective ears 61 are disposed at two sides of the auxiliary seat 6. The projective ears 61 are hollow. After the screw posts 412 pass through in order the adjustment screw nuts 411, the elastic bodies 43, the projective ears 61, and the through holes 421, the adjustment screw nuts 411 are used to tightly screw the elastic bodies 43, the photosensitive substrate 3, and the auxiliary seat 6 between the fixing screw nuts 422 and the adjustment screw nuts 411 so that the seat 2, the auxiliary seat 6, and the photosensitive substrate 3 can be connected and fixed together.

Figure 6:
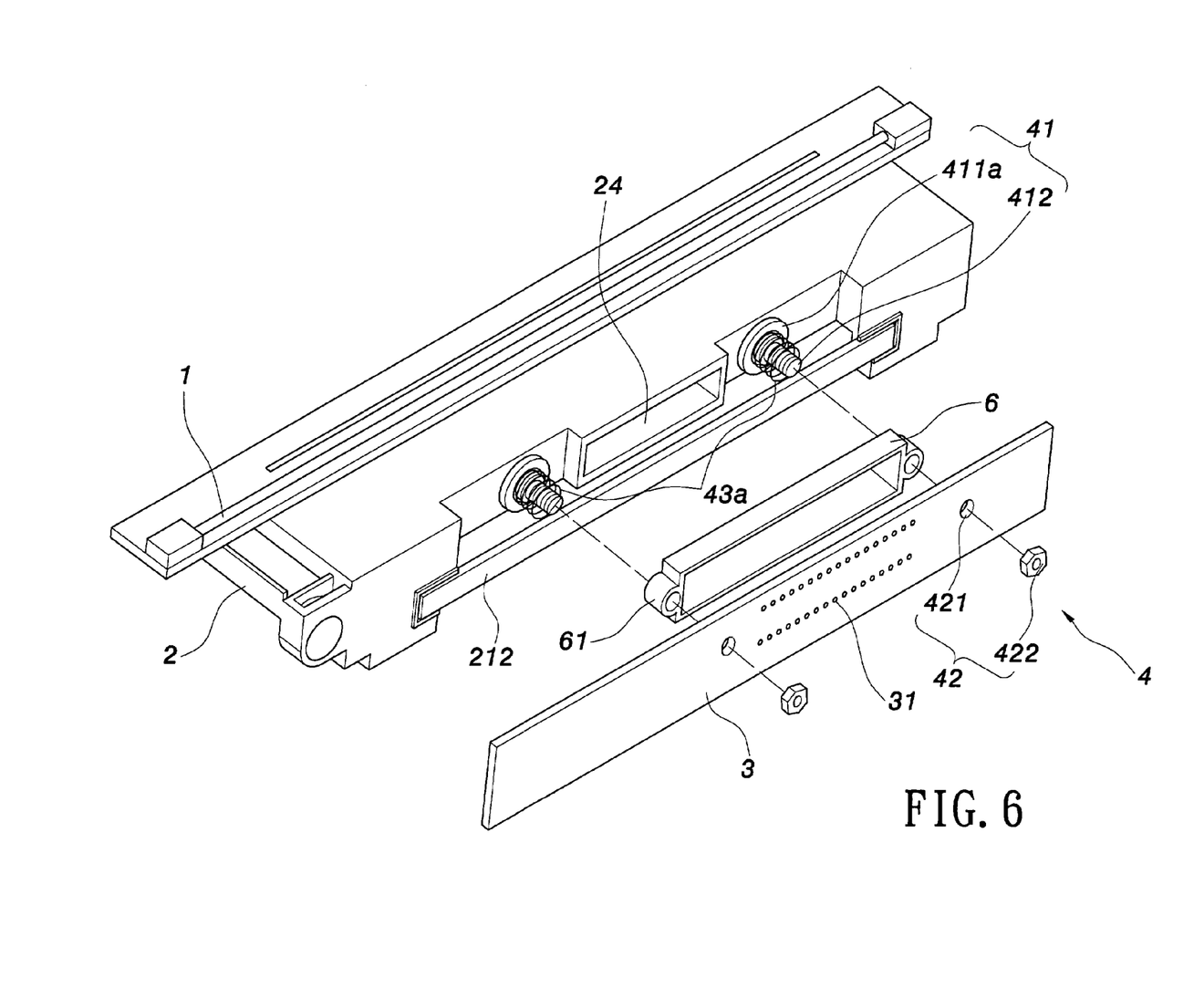
FIG. 6 is a perspective view of a third embodiment of the present invention.

The adjustment screw nuts 411 in FIG. 4 can be replaced with gaskets 411*a* shown in FIG. 6. The gaskets 411*a* are slipped onto the screw posts 412. The fixing screw nuts 422 are used to tightly screw the photosensitive substrate 3 and the auxiliary seat 6 onto the screw posts 412 so as to let elastic bodies 43*a* be compressed and the gaskets 411*a* abut against the base 2. The base 2, the auxiliary seat 6, and the photosensitive substrate 3 can thus be connected and fixed together.

Figure 7:
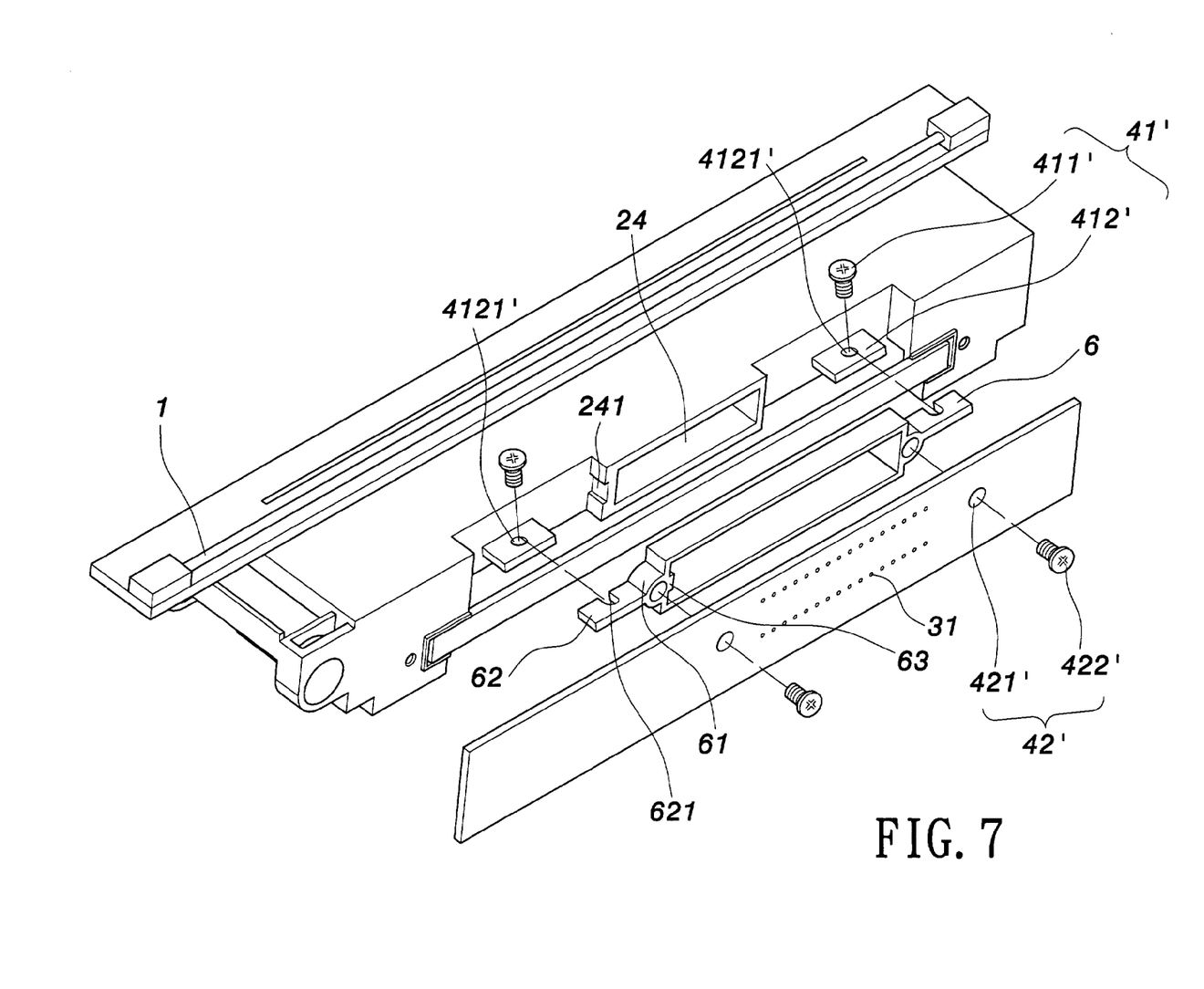
FIG. 7 is a perspective view of a fourth embodiment of the present invention.

As shown in FIG. 7, the first connection portion 41' is composed of adjustment screws 411' and projective boards 412'. The projective boards 412' are disposed at two sides of the opening 24. Fixing holes 4121' are formed on the projective boards 412' so that the adjustment screws 411' can pass through the fixing holes 4121'. A fixing hole 241 is disposed beside the opening 24.

The second connection portion 42' is composed of through holes 421' and fixing screws 422'. The through holes 421' are disposed at two sides of the CCD 31, and are passed through by the fixing screws 422'.

A positioning pin 63 is disposed inside the auxiliary seat 6. The projective ears 61 located at two sides of the auxiliary seat 6 have inner threads (not shown) at inner sides thereof to be screwed with the fixing screws 422'. A sideboard 62 is extended from one side of each of the projective ears 61, and a cut trench 621 is formed on each of the sideboards 62.

When the first connection portion 41' and the second connection portion 42' are connected, the positioning pin 63 of the auxiliary seat 6 and the positioning hole 241 of the opening 24 are first joined together to let the sideboards 62 at two sides of the auxiliary seat 6 adjoin the projective boards 412'. The adjustment screws 411' then pass through the fixing holes 4121' and are screwed with the cut trenches 621 of the sideboards 62 so that the base 2 and the auxiliary seat 6 can be connected and fixed together. On the other hand, the fixing screws 422' first pass through the through holes 421' of the photosensitive substrate 3, and are then screwed with the projective ears 61 of the auxiliary seat 6 so that the photosensitive substrate 3 and the auxiliary seat 6 can be connected and fixed together. When the optical length between the base 2 and the photosensitive substrate 3 is adjusted, the screwed position of the adjustment screws 411' with the cut trenches 621 are controlled to accomplish the function of adjusting the total optical length, thereby offsetting inaccuracy in manufacturing of the camera lens 22 or inaccuracy of the total optical length due to other factors.

To sum up, the scanning module capable of finely tuning the optical length of the present invention has the following characteristics.

1. Regardless of factors causing inaccuracy of magnification, the total optical length can be adjusted by adjusting the position of the camera lens and the adjustment unit, hence letting the inaccuracy of magnification of the scanning module meet the requirement and enhancing the yield and quality of production.
2. The whole CCD can be easily adjusted to the best focus position by forwards and rearwards tuning two fixing screw nuts. Bad focusing at one end will not happen due to inaccuracy.
3. The operation of adjusting the optical length of the adjustment unit is simple. The adjustment screw nuts and the fixing screw nuts screwed onto the screw posts are forwards and rearwards adjusted to let the photosensitive substrate between the adjustment screw nuts and the fixing screw nuts accomplish the function of adjusting the optical length.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A scanning module capable of finely tuning an optical length, comprising:
   a lamp tube for providing a required light source for a document to be scanned;
   a base having a reflective mirror set and a camera lens, said reflective mirror set receiving light from said document and transmitting the light to said camera lens for focusing, and an opening disposed outside said base for outputting the light focused by said camera lens;
   a photosensitive substrate for performing image processing of the light focused by said camera lens; and
   an adjustment unit for adjusting the optical length between said base and said photosensitive substrate, said adjustment unit comprising:
   a first connection portion for adjusting said optical length and disposed beside said opening; and
   a second connection portion disposed on said photosensitive substrate, said second connection portion being screwed onto said first connection portion so that said base and said photosensitive substrate are connected and fixed together.

2. The scanning module capable of finely tuning the optical length as claimed in claim 1, wherein said photosensitive substrate has a charge-coupled device.

3. The scanning module capable of finely tuning the optical length as claimed in claim 1, wherein said first connection portion comprises a screw post and an adjustment screw nut disposed at an outside of said base, said adjustment screw nut is screwed onto said screw post, and a position where said adjustment screw nut is screwed onto said screw post determines said optical length.

4. The scanning module capable of finely tuning the optical length as claimed in claim 3, wherein said second connection portion comprises a through hole disposed on said photosensitive substrate and a fixing screw nut, said through hole is passed through by said screw post, and said fixing screw nut is used to tightly screw said photosensitive substrate between said adjustment screw nut and said fixing screw nut.

5. The scanning module capable of finely tuning the optical length as claimed in claim 4, wherein an elastic body is disposed between said base and said photosensitive substrate, and said screw post passes through said elastic body and said through hole.

6. The scanning module capable of finely tuning the optical length as claimed in claim 5, wherein said elastic body is a spring.

7. The scanning module capable of finely tuning the optical length as claimed in claim 1, wherein said first connection portion comprises a screw post disposed at an outside of said base and a gasket, and said gasket is slipped onto said screw post.

8. The scanning module capable of finely tuning the optical length as claimed in claim 7, wherein said second connection portion comprises a through hole and a fixing screw nut disposed on said photosensitive substrate, said through hole is passed through by said screw post, and said fixing screw nut is used to tightly screw said photosensitive substrate between said gasket and said fixing screw nut.

9. The scanning module capable of finely tuning the optical length as claimed in claim 8, wherein an elastic body is disposed between said base and said photosensitive substrate, and said screw post passes through said elastic body and said through hole.

10. The scanning module capable of finely tuning the optical length as claimed in claim 9, wherein said elastic body is a spring.

11. A scanning module capable of finely tuning an optical length, comprising:
    a lamp tube for providing a required light source for a document to be scanned;
    a base having a reflective mirror set and a camera lens, said reflective mirror set receiving a light from said document and transmitting the light to said camera lens for focusing; a photosensitive substrate for performing image processing of the light focused by said camera lens;
    an auxiliary seat independently disposed between said photosensitive substrate and said base; and
    an adjustment unit for adjusting the optical length between said base and said photosensitive substrate.

12. The scanning module capable of finely tuning the optical length as claimed in claim 11, wherein said photosensitive substrate has a charge-coupled device.

13. The scanning module capable of finely tuning the optical length as claimed in claim 11, wherein an opening for outputting the light focused by said camera lens is disposed outside said base, and said adjustment unit comprises: a first connection portion for adjusting said optical length and disposed beside said opening; and a second connection portion disposed on said photosensitive substrate, said second connection portion being joined with said first connection portion, said auxiliary seat being located between said first connection portion and said second connection portion so that said base, said auxiliary seat, and said photosensitive substrate can be connected and fixed together.

14. The scanning module capable of finely tuning the optical length as claimed in claim 13, wherein said first connection portion comprises a screw post disposed at an outside of said base and an adjustment screw nut, said adjustment screw nut is screwed onto said screw post, and a position where said adjustment screw nut is screwed onto said screw post determines said optical length.

15. The scanning module capable of finely tuning the optical length as claimed in claim 14, wherein said second connection portion comprises a through hole disposed on said photosensitive substrate and a fixing screw nut, said through hole is passed through by said screw post, and said fixing screw nut is used to tightly screw said photosensitive substrate and said auxiliary seat between said adjustment screw nut and said fixing screw nut.

16. The scanning module capable of finely tuning the optical length as claimed in claim 15, wherein said auxiliary seat is a long hollow shell body to be passed through by a light, projective ears are disposed at two sides of said auxiliary seat, and said projective ears are hollow so that said screw post can pass therethrough.

17. The scanning module capable of finely tuning the optical length as claimed in claim 16, wherein an elastic body is disposed between said base and said auxiliary seat, and said screw post passes through said elastic body, said projective ear, and said through hole.

18. The scanning module capable of finely tuning the optical length as claimed in claim 17, wherein said elastic body is a spring.

19. A scanning module capable of finely tuning an optical length, comprising:
- a lamp tube for providing a required light source for a document to be scanned;
- a base having a reflective mirror set and a camera lens, said reflective mirror set receiving light from said document and transmitting the light to said camera lens for focusing, an opening for outputting the light focused by camera lens being disposed outside said base, a positioning hole being disposed beside said opening;
- a photosensitive substrate for performing image processing of the light focused by said camera lens;
- an auxiliary seat independently disposed between said photosensitive substrate and said base, a positioning pin being disposed in said auxiliary seat, said positioning pin being joined with said positioning hole, a projective ear being disposed at one side of said auxiliary seat, an inner thread being disposed at an inside of said projective ear, a sideboard being extended from one side of said projective ear, a cut trench being disposed on said sideboard; and
- an adjustment unit for adjusting the optical length between said base and said photosensitive substrate.

20. The scanning module capable of finely tuning the optical length as claimed in claim 19, wherein said photosensitive substrate has a charge-coupled device.

21. The scanning module capable of finely tuning the optical length as claimed in claim 19, wherein said adjustment unit comprises: a first connection portion for adjusting said optical length, said first connection portion comprising an adjustment screw and a projective board, said projective board being disposed at two sides of said opening, a fixing hole being disposed on said projective board, said adjustment screw passing through said fixing hole to be screwed onto said cut trench so that said base and said auxiliary seat can be connected and fixed together; and a second connection portion disposed on said photosensitive substrate, said second connection portion comprising a through hole and a fixing screw, said fixing screw passing through said through hole to be screwed onto said projective ear so that said photosensitive substrate and said auxiliary seat can be connected and fixed together.

* * * * *